US008844457B2

(12) United States Patent
Buzzi

(10) Patent No.: US 8,844,457 B2
(45) Date of Patent: Sep. 30, 2014

(54) QUICK METHOD FOR BUILDING BOATS

(75) Inventor: Fabio Buzzi, Oggiono (IT)

(73) Assignee: FB Design S.R.L., Annone Brianza (LC) (IT)

( * ) Notice: Subject to any disclaimer, the term of this patent is extended or adjusted under 35 U.S.C. 154(b) by 323 days.

(21) Appl. No.: 13/386,395

(22) PCT Filed: Jun. 28, 2010

(86) PCT No.: PCT/IB2010/001572
§ 371 (c)(1),
(2), (4) Date: Jan. 20, 2012

(87) PCT Pub. No.: WO2011/010196
PCT Pub. Date: Jan. 27, 2011

(65) Prior Publication Data
US 2012/0111252 A1    May 10, 2012

(30) Foreign Application Priority Data

Jul. 22, 2009   (IT) .......................... MI2009A001301

(51) Int. Cl.
| *B63B 3/56* | (2006.01) |
| *B29C 65/00* | (2006.01) |
| *B63B 5/24* | (2006.01) |
| *B29C 65/56* | (2006.01) |
| *B63B 9/06* | (2006.01) |
| *B29C 65/54* | (2006.01) |
| *F16B 11/00* | (2006.01) |
| *B63B 29/02* | (2006.01) |
| *E04B 1/61* | (2006.01) |
| *B63B 3/58* | (2006.01) |
| *B29C 65/76* | (2006.01) |
| *B29L 31/30* | (2006.01) |

(52) U.S. Cl.
CPC ......... *B29C 65/542* (2013.01); *B29C 66/52431* (2013.01); *B63B 2221/00* (2013.01); *F16B 11/006* (2013.01); *B63B 2221/10* (2013.01); *B63B 5/24* (2013.01); *B29C 66/43* (2013.01); *B63B 29/02* (2013.01); *B29C 66/5241* (2013.01); *E04B 1/6108* (2013.01); *B29C 65/562* (2013.01); *B29C 66/721* (2013.01); *B63B 9/06* (2013.01); *B63B 3/58* (2013.01); *B29C 66/43421* (2013.01); *B29C 66/12441* (2013.01); *B29C 66/52297* (2013.01); *B29C 66/52441* (2013.01); *B29C 66/52291* (2013.01); *B29C 65/76* (2013.01); *B29C 66/43441* (2013.01); *B29L 2031/3067* (2013.01); *B29C 66/723* (2013.01)
USPC ........................................... 114/78

(58) Field of Classification Search
CPC ............. B63B 3/00; B63B 3/02; B63B 3/04; B63B 3/06; B63B 3/08; B63B 3/48; B63B 3/56; B63B 3/68; B63B 5/00; B63B 39/00; B63B 11/00; B63B 11/02
USPC ......... 114/65 R, 77 R, 85, 86–88; 428/423.1, 428/625; 156/331.4
See application file for complete search history.

(56) References Cited

U.S. PATENT DOCUMENTS

| 6,630,249 | B2 * | 10/2003 | Kennedy | 428/625 |
| 6,706,406 | B1 * | 3/2004 | Kennedy | 428/423.1 |
| 6,984,452 | B2 * | 1/2006 | Kennedy | 428/423.1 |
| 2001/0035266 | A1 * | 11/2001 | Kennedy | 156/331.4 |
| 2005/0158562 | A1 * | 7/2005 | Kennedy | 428/423.1 |

FOREIGN PATENT DOCUMENTS

| GB | 682 199 A | 11/1952 |
| GB | 1 376 673 A | 12/1974 |
| GB | 2 118 905 A | 11/1983 |
| GB | 2 299 549 A | 10/1996 |
| WO | WO2004/050467 A1 | 6/2004 |

OTHER PUBLICATIONS

PCT Search Report dated Dec. 27, 2010.

* cited by examiner

Primary Examiner — Daniel V Venne
(74) Attorney, Agent, or Firm — Hedman & Costigan, P.C.; James V. Costigan; Kathleen A. Costigan

(57) ABSTRACT

Method for building boats comprising a plurality of panels (11, 12) attached at the bottom and at the side to a hull (13) and at the top to a deck (14) suitable for defining a plurality of watertight compartments in the underdeck area, the method comprising the steps of attaching together the panels (11, 12) according to predetermined angles through fitting elements (20, 20', 20") of the type provided with at least two pathways for receiving the panels (11, 12), mutually arranged according to predetermined angles, and a pathway for receiving adhesive from outside and for distributing it in the pathways for receiving the panels (11, 12), anchoring the panels (11, 12) to the deck (14) and to the sides (13') of the hull (13).

8 Claims, 8 Drawing Sheets

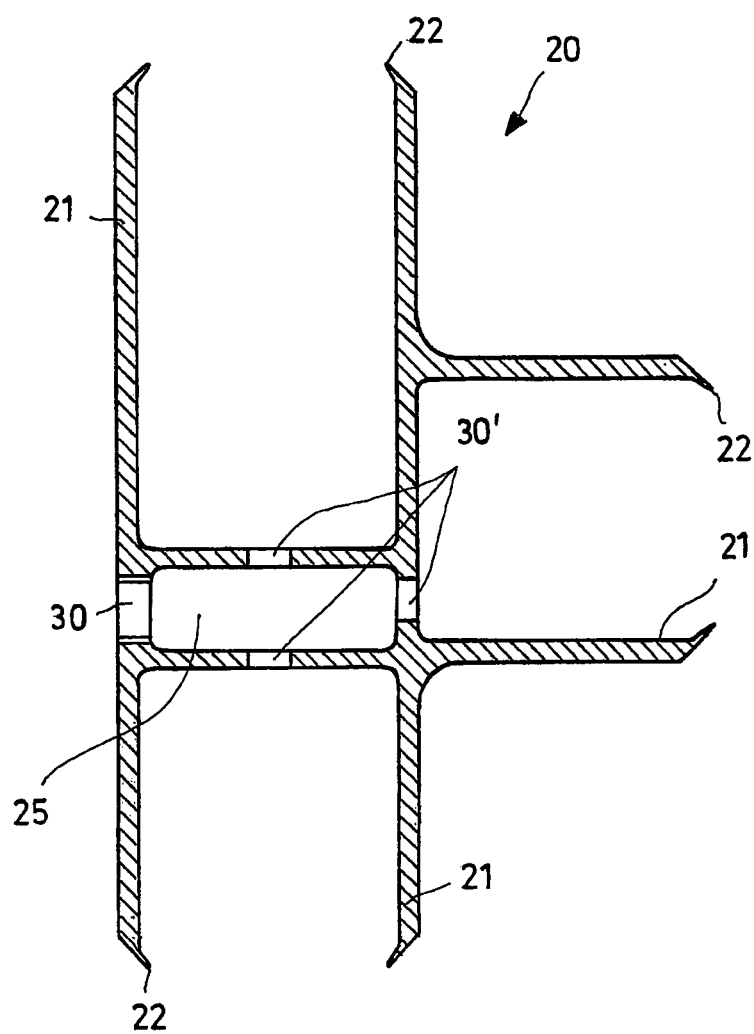

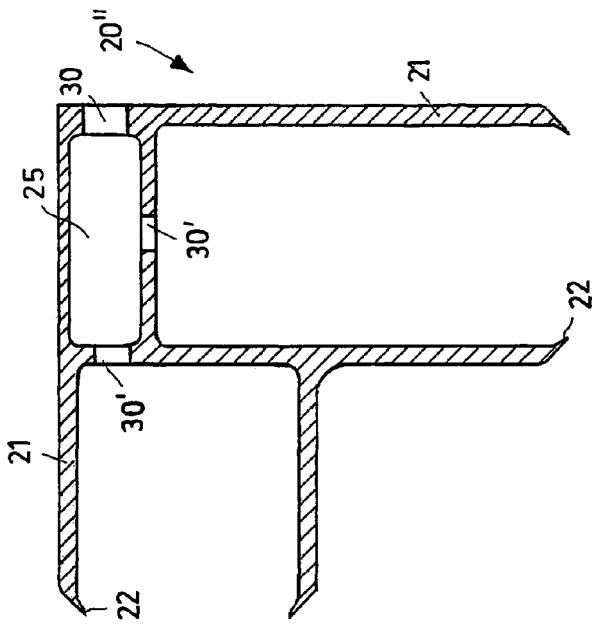
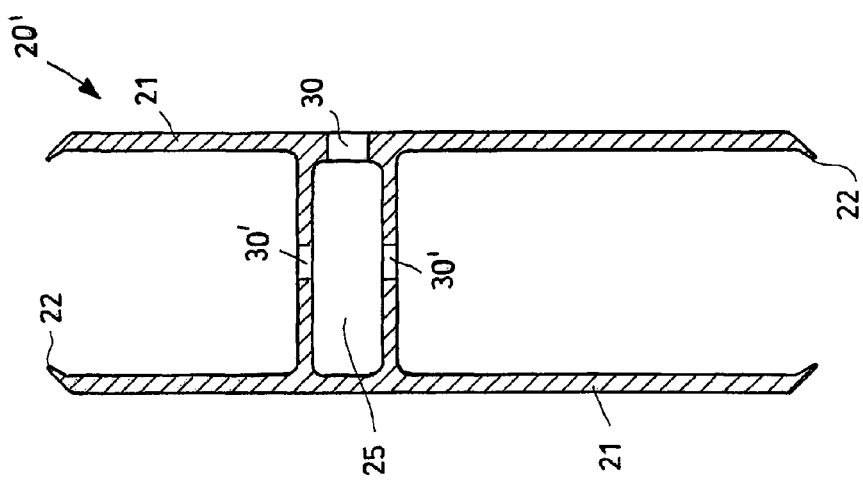

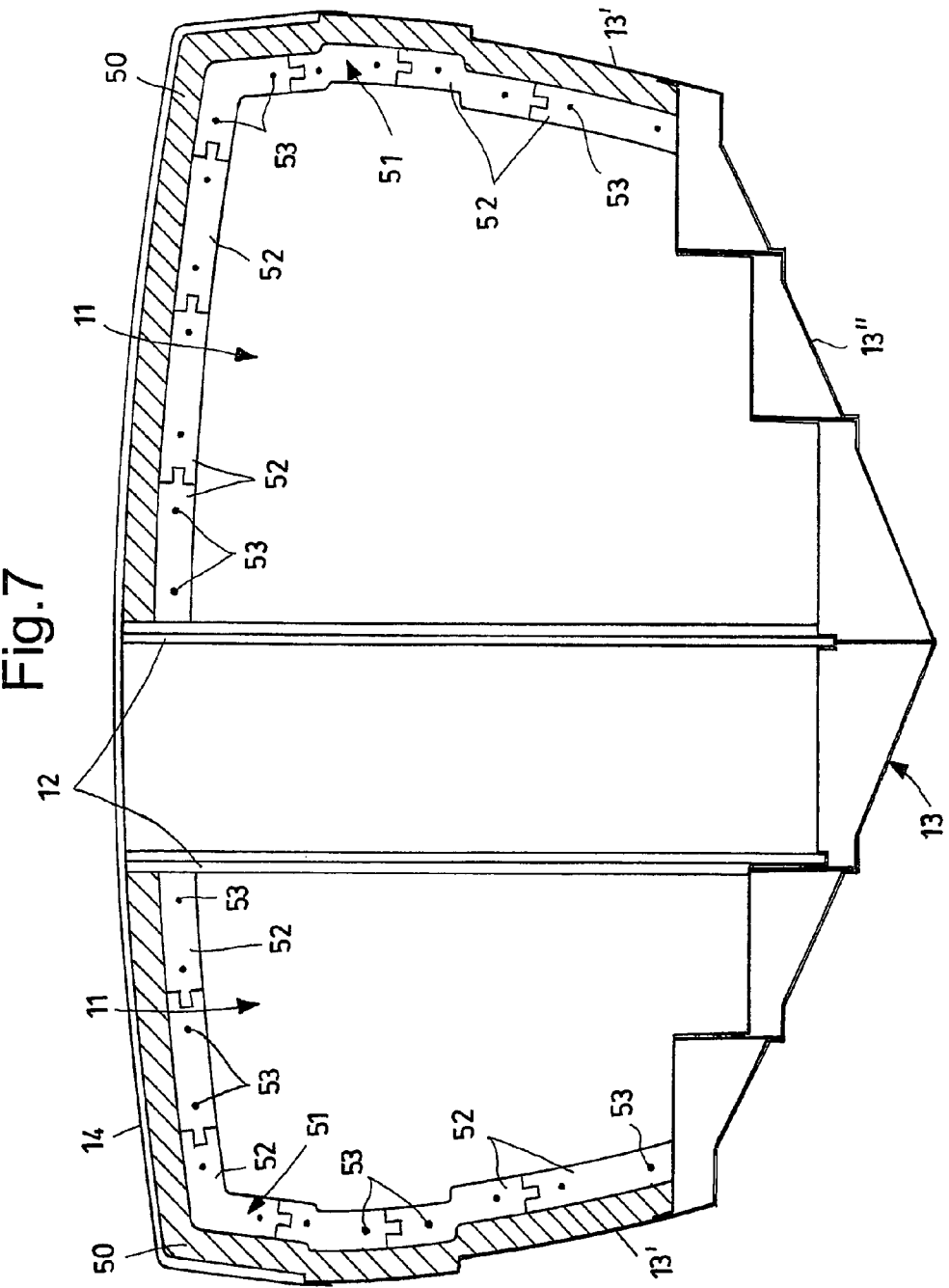

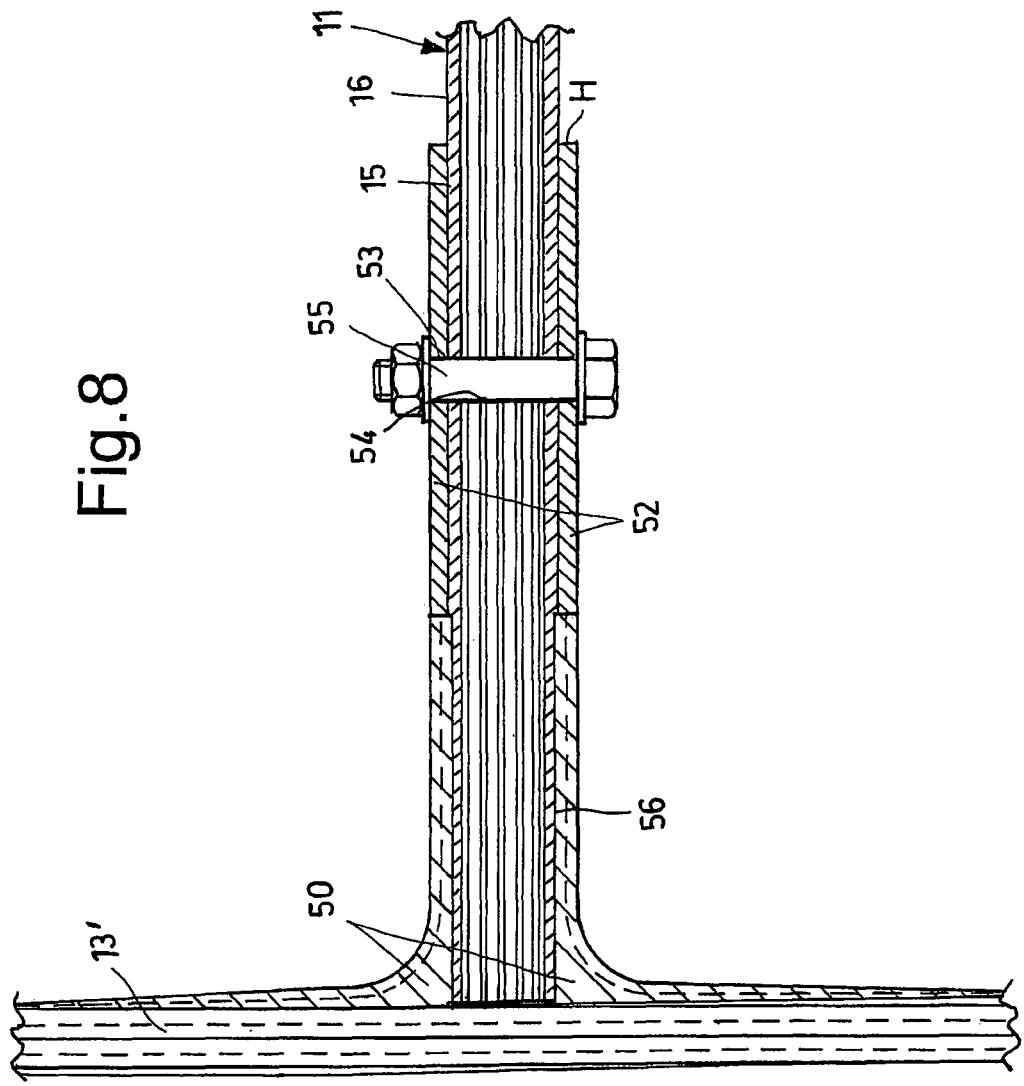

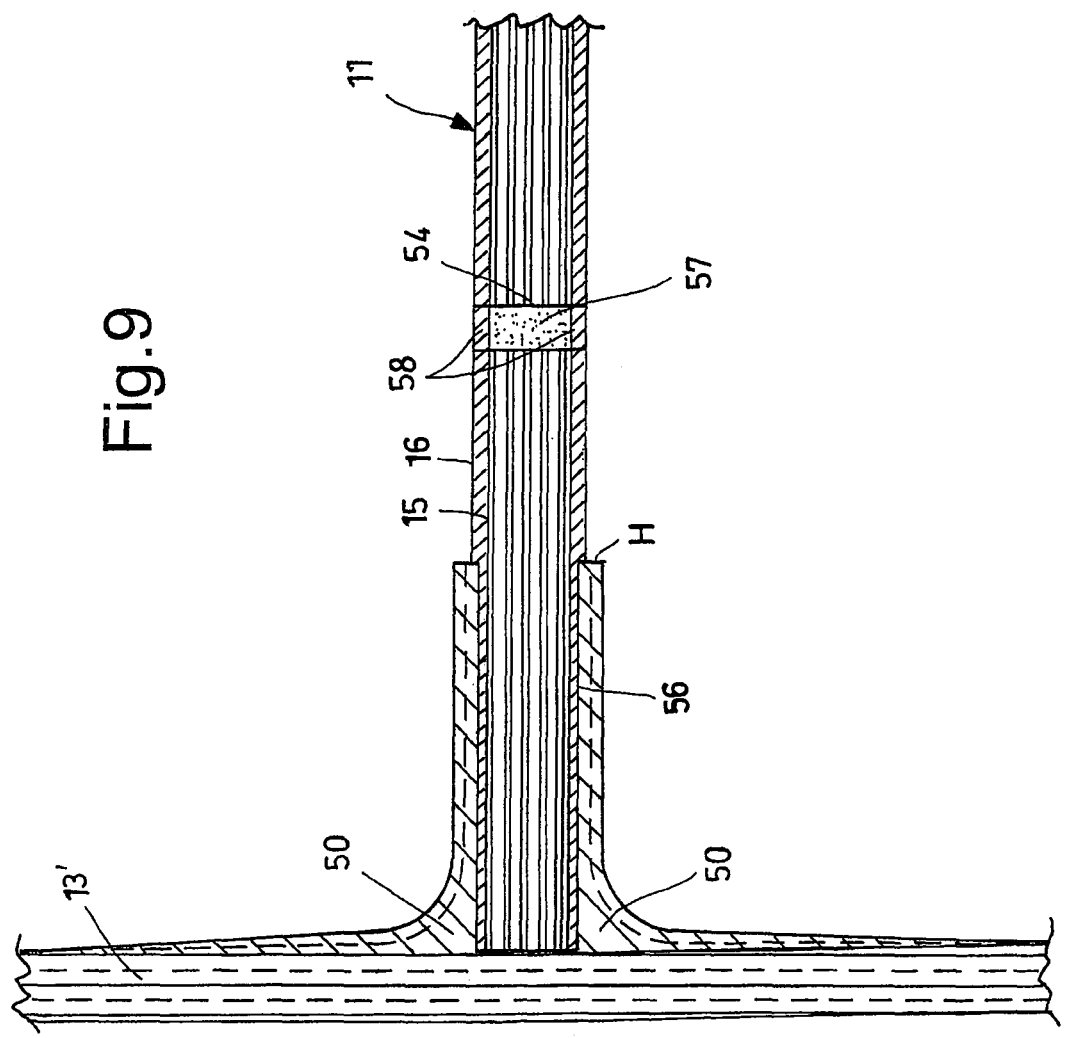

QUICK METHOD FOR BUILDING BOATS

The present invention refers to a quick method for building boats.

In particular it refers to boats of the type comprising a plurality of panels, or bulkheads, attached firstly together and then to a hull and a deck, so as to define a plurality of watertight compartments in the underdeck area.

In the steps of building such boats, the hull and deck of which are usually made from fiberglass, the step concerning the assembly of the bulkheads and the relative attachment to the bottom of the hull is of particular importance.

This step is followed by the closing of the boat firstly through welding of the deck to the hull and then welding of the transversal bulkheads to the aforementioned deck and to the sides of the hull.

Such welding procedures listed above thus have the purpose of joining the hull to the deck and of dividing the underdeck area into watertight compartments to create internal rooms.

Such rooms are defined by walls arranged longitudinally to the boat that define the spaces existing between two transversal bulkheads fixed to the deck and to the sides of the hull.

Currently, the conventional technique for building boats of the aforementioned type foresees the use of bulkheads made from cut marine-grade plywood, using numerically controlled machines, and welded both together and to the rest of the hull using the same materials with which the hull itself is made, i.e. in particular fiberglass and resin.

The panels made from marine-grade plywood are then finished over their entire surface with layers of fiberglass, in order to ensure greater strength and impermeability, and then coated with gelcoat, applied at times according to the "peel" technique in order to make a surface finish similar to orange peel.

These operations that are carried out during the assembly of the boat transform the original panels made from marine-grade plywood into a sandwiched laminate in which fiberglass films are applied to the core, made from marine-grade plywood.

The aforementioned operations are currently carried out manually and take more time the bigger and more complex is the boat that is being built.

In particular, the step of welding together the bulkheads is particularly disadvantageous both because it requires a long time period and because it can easily result in errors in the required mutual angular arrangement of the bulkheads.

It should also be noted that after the welding of the bulkheads it is necessary to carry out a surface processing on them to make the worked surface homogeneous.

The purpose of the present invention is to make a quick method for building boats capable of solving the aforementioned drawbacks of the prior art in an extremely simple, cost-effective and particularly functional manner.

Another purpose is to make a method for building boats in which the mutual assembly step of the panels takes place without any welding.

Yet another purpose is to make a method for building boats in which it is possible to use sandwiched pre-laminated panels having, even before assembly, a fiberglass coating possibly coated with gelcoat.

These purposes according to the present invention are accomplished by making a quick method for building boats as outlined in claim 1.

Further characteristics of the invention are outlined by the subsequent claims.

The characteristics and advantages of a quick method for building boats according to the present invention will become clearer from the following description, given as an example and not for limiting purposes, referring to the attached schematic drawings, in which:

FIGS. 1-3 show respective section views of fitting elements according to the present invention for joining three panels at 0°, 90° and 180°, two panels at 0° and 90° and two panels at 0° and 180°;

FIG. 7 shows a cross section view of the boat during the step of anchoring the transversal panels to the deck and to the sides of the hull;

FIG. 8 shows a section view of the boat during the step of anchoring the transversal panels to the deck and to the sides of the hull of FIG. 7; and FIG. 9 shows a section view of the boat during the final step of anchoring the transversal panels to the deck and to the sides of the hull.

Figure 4:
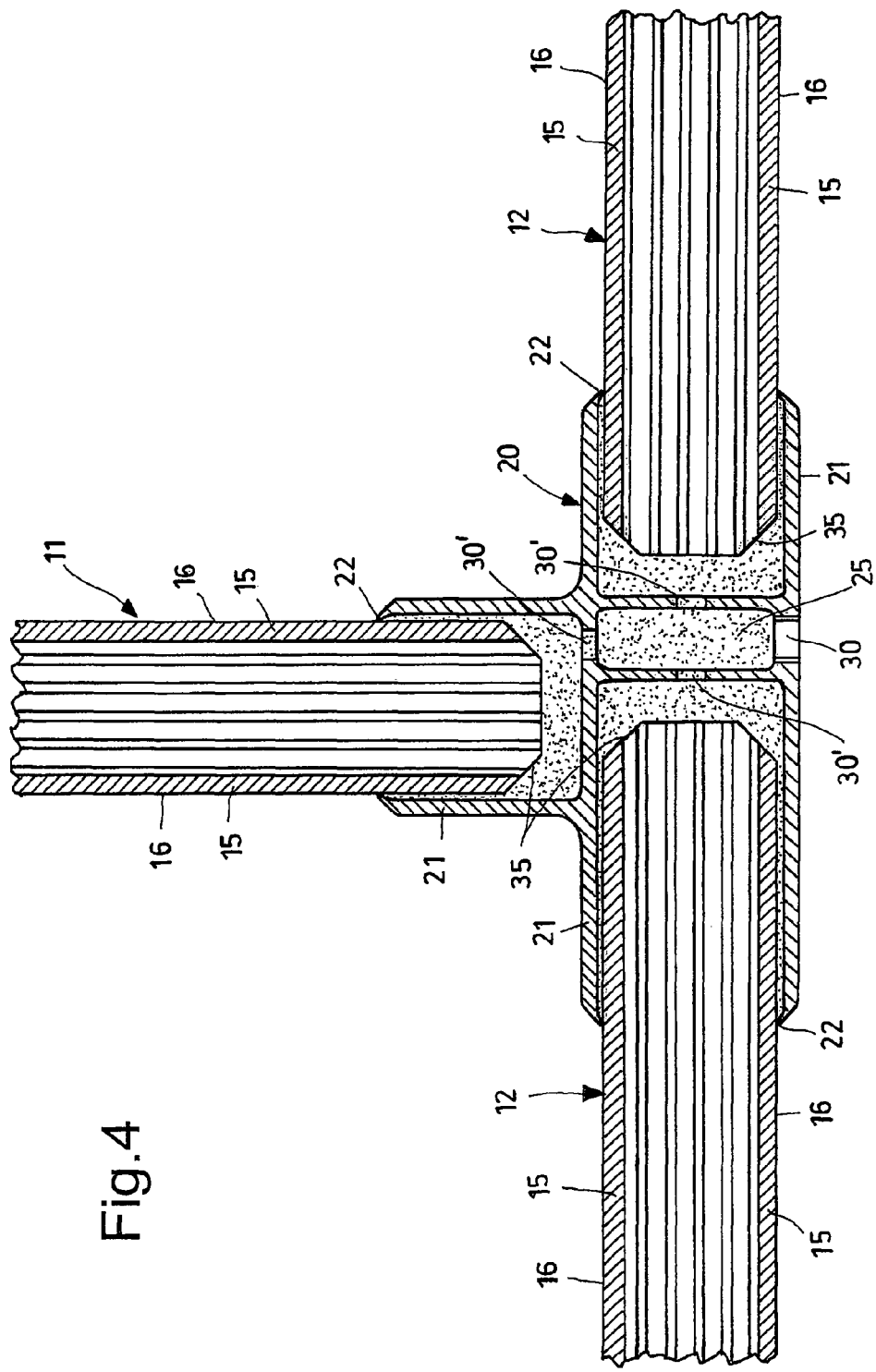
FIG. 4 shows a section view of the fitting element of FIG. 1 coupled with the relative panels.
Figure 5:
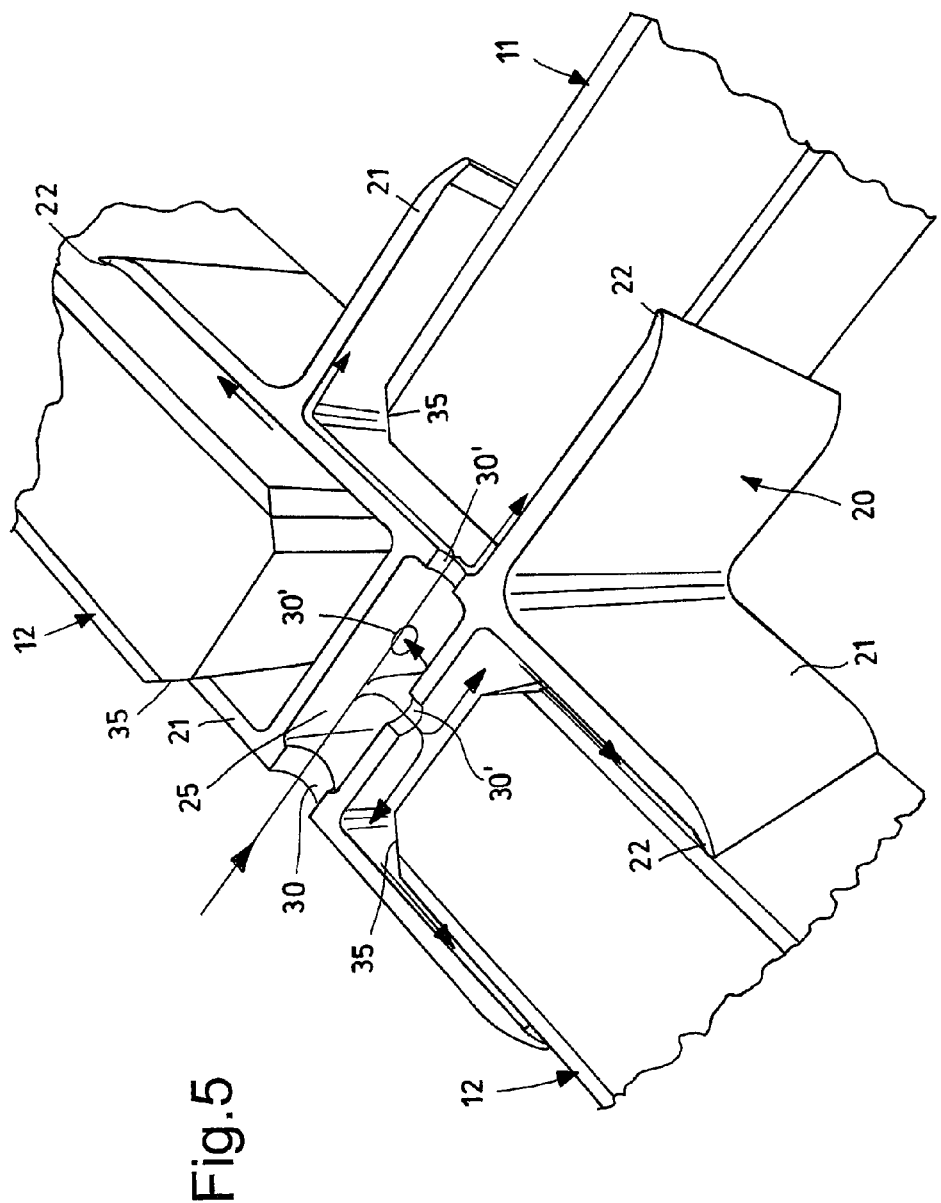
FIG. 5 shows an axonometric section view of the fitting element of FIG. 1 coupled with the relative panels during the gluing step.
Figure 6:
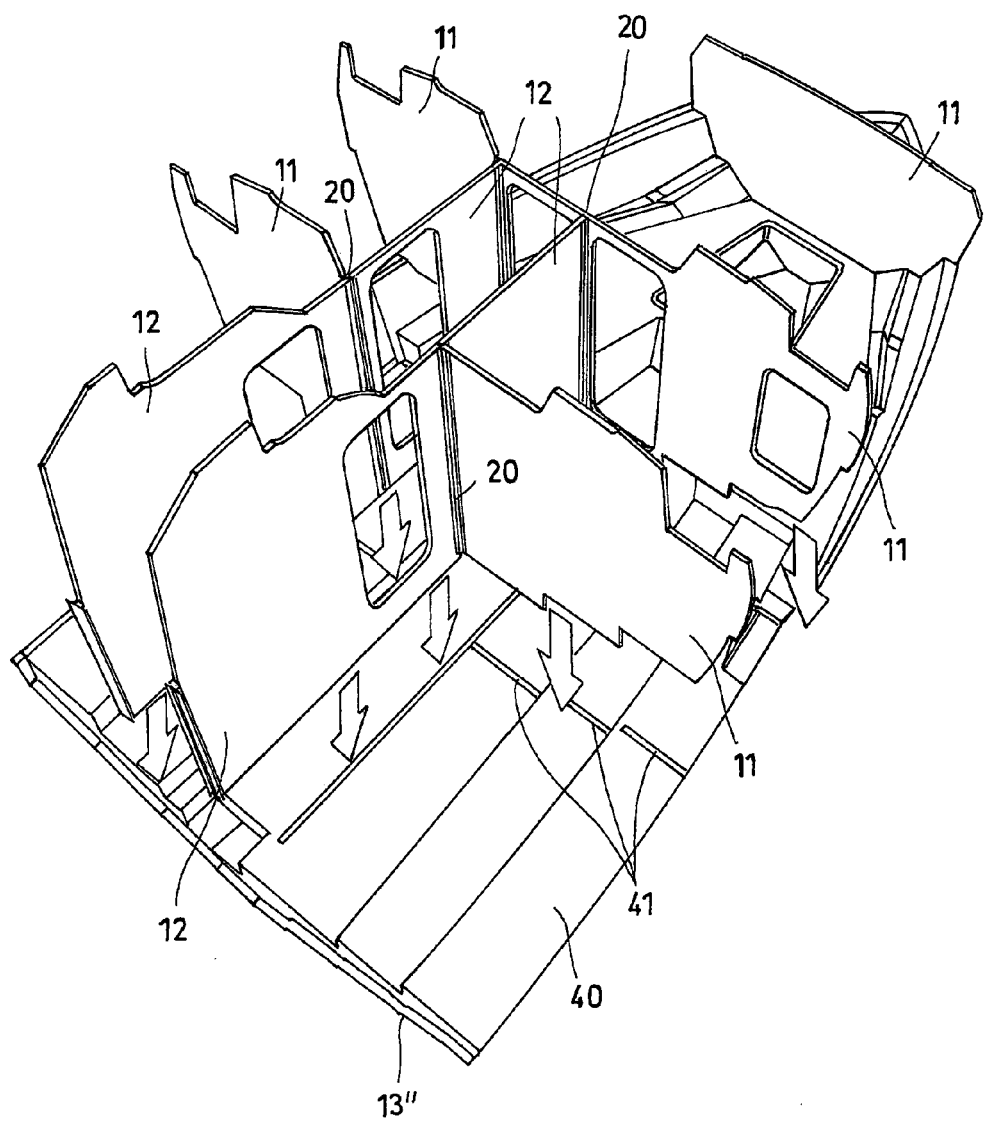
FIG. 6 shows an axonometric view of the panels that constitute the compartmenting of the boat pre-assembled with the respective fitting elements in the act of being fixed to the coating molding of the bottom of the hull.

With reference to the figures, a method for building boats is described of the type comprising a plurality of transversal and longitudinal bulkheads or panels 11, 12 attached together as well as at the bottom and laterally to a hull 13 and at the top to a deck 14 in order to define a plurality of watertight compartments in the underdeck area.

In particular, according to the invention the panels 11, 12 used are sandwiched pre-laminated panels in which the films 15 are made from composite material, for example preferably fiberglass, possibly coated with gelcoat 16.

For the sake of ease of explanation in the rest of the description we shall refer solely to fiberglass, but nevertheless such a term should be taken to also include any other similar composite material suitable for marine use.

The hull 13 and the deck 14 are also made from the same composite material as the films 15 of the panels 11, 12, i.e. fiberglass, and are also possibly coated with gelcoat.

The method for building boats according to the present invention comprises the following steps of:
a) attaching together the transversal 11 and longitudinal 12 panels according to predetermined angles;
b) coupling the panels 11, 12 with the bottom 13" of the hull 13;
c) anchoring the panels 11, 12 to the deck 14 and to the sides 13' of the hull 13.

In particular, the step of attaching together the panels 11, 12 according to predetermined angles takes place without welding and comprises the following sub-steps of:
d) laterally coupling the panels 11, 12 with fitting elements 20, 20', 20" of the type with at least two pathways for receiving the panels 11, 12 mutually arranged according to predetermined angles;
e) introducing adhesive from the outside into the fitting 20, 20', 20" to attach the panels 11, 12 in the at least two pathways for receiving the fitting itself.

The first element that thus makes it possible to carry out the method described above without requiring welding in the step of coupling together the panels are the fitting elements 20, 20', 20" that attach together the transversal 11 and longitudinal 12 panels to define the underdeck rooms.

Preferably, such fitting elements 20, 20', 20" with at least two receiving pathways are extruded profiles made from aluminum possibly anodized or else pultruded in fiberglass.

As described earlier, the function of these fitting elements 20, 20', 20" is to allow the relative attachment of the panels 11, 12 according to predetermined angles without requiring welding thus making the step of attaching together the transversal 11 and longitudinal 12 panels according to predetermined angles very quick.

In this sense such fitting elements 20, 20', 20" make it possible to use sandwiched laminated panels having a fiberglass coating even before assembly, thus drastically reducing the time currently required to assemble an analogous boat.

Preferably, such fitting elements 20, 20', 20" make it possible to glue panels respectively together to define angles equal to 0°, 90° and/or 180°.

Of course, the arrangement given above are only non-limiting examples.

The coupling of the panels 11, 12 with the fitting elements 20, 20', 20" takes place through the introduction of a side of the panels 11, 12 in jaws 21 of the fitting elements 20, 20', 20" mutually arranged according to predetermined angles.

Such jaws 21 have the dual purpose of holding the panels 11, 12 in position without allowing alignment errors as well as of forming a gluing chamber for the relative panels 11, 12.

In order to further hold the panels 11, 12 in the relative jaw 21, the width of the mouth 22 of the latter is slightly smaller than the thickness of the relative panel 11, 12 whereas the height of the gluing chamber is a few millimeters, i.e. just enough so that the gluing occurs through a suitable amount of structural adhesive.

In this way during the gluing step the adhesive also penetrates into the gap existing between the jaws 21 and the side walls of the panels 11, 12.

In order to allow the aforementioned introduction of adhesive into the fitting elements 20, 20', 20", the latter comprise a central chamber 25 intended firstly to receive the structural adhesive injected under pressure from the outside and then distribute it to the various jaws 21 for receiving the panels 11, 12.

Therefore, in some predetermined points, there are holes 30, 30' for passage and communication from the outside towards the central chamber 25 and from here towards the jaws 21.

Preferably, the wall of the central chamber 25 facing towards the outside will have a greater thickness with respect to the other walls so that it can be threaded in order to be coupled with injection means of the adhesive.

The transversal 11 and longitudinal 12 panels are cut from pre-laminated panels preferably with a numerically controlled machine and then machined to have a chamfering 35 of a few millimeters along the two edges of the side that will locked in the jaws 21.

The chamfering 35 has multiple purposes: firstly it makes it easier to insert into the relative jaw 21; secondly, it promotes the flow of the structural adhesive inside the jaws 21 towards the side walls of the panels increasing the binding surface of the structural adhesive.

Once the vertical height of the fitting elements 20, 20', 20" has been set, based on the structural elements to install, they form vertical columns laterally associated with the panels 11, 12.

Preferably, such a column can be divided into many sectors arranged one on top of the other along the same side of the panel 11, 12 in which in every sector it is possible to carry out the injection of structural adhesive separately.

For each of these sectors there will thus be at least one injection hole 30 of the structural adhesive towards the central chamber 25 that, as described, carries out the role of a collector towards the jaws 21 for gripping the panels 11, 12.

The structural adhesive, prepared in a sufficient quantity for the volume to be filled, is injected under pressure so as to occupy all of the space between the jaws 21 and the panels 11, 12.

For this reason, the means for injecting the adhesive will be equipped with removable fluid-tight fittings, to be connected with the injection points 30 obtained on the outer wall of the fitting elements 20, 20', 20" of greater thickness.

Such gluing operations of the panels to carry out the desired compartmentalization can also be carried out prior to the fitting out of the boat.

The next step consists of applying the panels 11, 12 fixed together on the base 40 of the hull 13.

In order to allow such an operation, the fiberglass molding of the base 40 that covers the bottom of the hull 13 is equipped with guides 41 or depressions in which to insert panels 11, 12.

In this way it is ensured that the panels 11, 12 are vertical and/or oriented correctly.

The fixed attachment of the panels 11, 12 in such guides or depressions 41 is then further secured preferably through silicon.

Once the compartmentalization panels 11, 12 have been applied and fixed to the base 40 of the hull 13, firstly the step of welding the deck 14 to the hull 13 takes place and then the welding of the panels themselves 11, 12 to the deck 14 and to the sides 13' of the hull 13 takes place.

This operation is carried out by welding the aforementioned elements to be joined through strips of fiberglass 50, on which a gelcoat surface finish is then carried out, applied, for example, according to the peel technique.

Once the designer has decided upon the thickness of such strips 50 of fiberglass, an important parameter from the point of view of the contribution that the panels 11, 12 provide to the torsional structural strength of the boat, according to the invention masks 51 are arranged on the transverse panels 11 at the deck 14 and the side walls 13' of the hull 13 so as to define a perimeter band of substantially constant thickness.

Such masks 51, which can for example be metallic, have a thickness H equal to that foreseen for the foreseen welding in fiberglass.

The width of the welding area is thus defined by the masks 51 which can be arranged according to the wishes of the designer.

In order to make it easier to use and apply, it is possible to divide the masks 51 into many elements 52 to be fitted together, for example with dovetail notches. Every element of the mask 51 has at least one hole 53 for fixing to the relative transverse panel 11 during welding.

The corresponding holes 54 of the panel 11 can already be made in the numerically controlled cutting step of the panels 11 themselves.

Then two series of masks 51 for every transverse panel 11 are positioned on the opposite faces and fixed to it through bolts 55.

In this way, it is avoided that the resin used for welding reaches the surface of the panel 11 beyond the mask 51, ruining it.

Before welding it is foreseen to abrade the gelcoat layer 16 of the panels in the welding area 56 defined by the mask and by the hull 13 to promote the adhesion to the panel 11 of the band of fiberglass 50 to be welded.

Once the strip 50 has been welded on one side to the hull 13 and/or to the deck 14 and on the other side to the panels 11 until it abuts with the mask 51, it is possible to foresee surfacing and lapping of the welded area 56 to make it tangent to the mask 51 and to the hull 13 and/or deck 14.

Possible excess lamination that is found on the mask 51 will be removed at the end of the process, with the removal of the mask 51 itself.

The surface finishing can take place according to known gelcoat peel techniques, or in any case according to the same technique adopted for the hull 13 and the deck 14 in that area.

Once the welding and finishing operations are finished on both faces of the panel 11, the mask 51 is removed and the holes 54 made for temporary attachment are filled with silicon 57 and closed with plugs 58, for example made from PVC, or else with gelcoat finishing, polished to restore the continuity and the appearance of the surface of the relative panel 11.

The result will be a pleasant transition between two surfaces with different finishing, with a step equal to the thickness of the weld.

It has thus been seen that the quick method for building boats according to the present invention achieves the purposes outlined earlier.

Indeed, the method of the present invention makes it possible to reduce the assembly times of the boat eliminating any welding during the relative assembly step of the panels and thus allowing the use of panels already in sandwiched pre-laminated form with, even before assembly, a fiberglass coating possibly coated with gelcoat.

The quick method for building boats of the present invention thus conceived can undergo numerous modifications and variants, all of which are covered by the same inventive concept; moreover, all of the details can be replaced with technically equivalent elements. In practice, the materials used, as well as their sizes, can be whatever according to the technical requirements.

The invention claimed is:

1. Method for building boats comprising a plurality of panels (11, 12) having a thickness, said panels (11,12) being attached to a hull (13) at a base (40) on a bottom (13") of said hull (13), at sides (13') of said hull (13) and to a deck (14) at a top of said hull (13) said plurality of panels (11,12) being suitable for defining a plurality of watertight compartments in an underdeck area, said panels (11, 12) being sandwiched and pre-laminated with films of fiberglass material; said hull (13) and deck (14) being made from fiberglass material, said method comprising the, following steps:
   a) attaching together said panels (11, 12) according to predetermined angles through fitting elements (20, 20', 20") having pathways for receiving said panels (11, 12), mutually arranged according to predetermined angles, and a pathway for receiving adhesive from outside and distributing it in said pathways for receiving said panels (11, 12);
   b) coupling said panels (11, 12) with the base (40) on the bottom (13") of the hull (13);
   c) anchoring said panels (11, 12) to the deck (14) and to the sides (13') of the hull (13); said step of attaching together said panels (11, 12) according to predetermined angles through fitting elements (20, 20', 20") comprising the following substeps:
   d) laterally coupling said panels (11, 12) with said pathways for receiving said fitting elements (20, 20', 20");
   e) introducing adhesive under pressure into said pathway for receiving adhesive of said fitting elements (20, 20', 20") for fixing said panels (11, 12) in said at least two receiving pathways wherein said step of anchoring said panels (11, 12) to the deck (14) and to the sides (13') of the hull (13) comprises the sub-step of welding together said panels (11, 12), said hull (13) and said deck (14) with a resin and strips of fiberglass (50) and including a step of fixing a mask (51) to said panels (11,12) with through bolts (55) passing through holes (54) of said panels (11,12), in a position that defines a welding area (56) between said mask (51) and said hull (13) and said deck (14).

2. Method according to claim 1, wherein said step of coupling said panels (11, 12) with said fitting elements (20, 20', 20") comprises a step of laterally introducing said panels (11, 12), which have sides, into jaws (21) formed in said fitting elements (20, 20', 20"), said jaws (21) having a mouth (22) of smaller dimensions than the thickness of said panels (11, 12) and a height sufficient to cover part of said panels (11, 12).

3. Method according to claim 2, comprising a step of chamfering the edges (35) on the sides of the panels (11, 12) before positioning said panels (11,12) in said jaws (21).

4. Method according to claim 2, wherein said step of introducing adhesive into said fitting elements (20, 20', 20") for fixing said panels (11, 12) in said pathways comprises a step of introducing adhesive under pressure into a central chamber (25) of said fitting elements (20, 20', 20") through a hole (30), said central chamber (25) being in connection through holes (30') with said jaws (21).

5. Method according to claim 1, wherein said step of coupling said panels (11, 12) with the bottom (13") of the hull (13) comprises a step of vertically introducing said panels (11, 12) in guides (41) formed on a base (40) of the bottom (13") of the hull (13).

6. Method according to claim 5, comprising a step of attaching the panels (11, 12) to said guides (41) formed on the base (40) on the bottom (13") of the hull (13).

7. Method according to claim 1, comprising a step of removing a gelcoat (16) from said panels (11, 12) at said welding area (56) before the arrangement and the welding of said strips of fiberglass (50).

8. Method according to claim 1, comprising a step of removing said mask (51) and of plugging said holes (54) of said panels (11, 12) for the passage of said bolts (55).

* * * * *